(12) United States Patent
Geng

(10) Patent No.: US 8,813,458 B2
(45) Date of Patent: Aug. 26, 2014

(54) CHANGEABLE PANEL ASSEMBLY AND METHOD OF ASSEMBLING A CHANGEABLE PANEL

(75) Inventor: David Geng, Orange (AU)

(73) Assignee: Electrolux Home Products Pty Limited, Mascot (AU)

( * ) Notice: Subject to any disclaimer, the term of this patent is extended or adjusted under 35 U.S.C. 154(b) by 142 days.

(21) Appl. No.: 13/376,448

(22) PCT Filed: Jun. 7, 2010

(86) PCT No.: PCT/AU2010/000704
§ 371 (c)(1),
(2), (4) Date: Feb. 29, 2012

(87) PCT Pub. No.: WO2010/141980
PCT Pub. Date: Dec. 16, 2010

(65) Prior Publication Data
US 2012/0145662 A1    Jun. 14, 2012

(30) Foreign Application Priority Data
Jun. 9, 2009    (AU) ................................ 2009902637

(51) Int. Cl.
*E04C 2/38* (2006.01)
*F16B 5/12* (2006.01)

(52) U.S. Cl.
CPC ..................................... *F16B 5/121* (2013.01)
USPC ......... 52/716.7; 52/312; 52/716.8; 52/718.03

(58) Field of Classification Search
USPC ............... 52/312, 716.1, 716.2, 716.6, 716.7, 52/716.8, 718.03, 717.03, 717.04, 717.05, 52/717.06, DIG. 8
See application file for complete search history.

(56) References Cited

U.S. PATENT DOCUMENTS

| 3,456,409 | A | * | 7/1969 | Piget ............................... 52/773 |
| 4,242,848 | A | * | 1/1981 | Schoultz .................... 52/717.06 |
| 4,531,339 | A | * | 7/1985 | Tomaszewski et al. ...... 52/716.1 |

(Continued)

FOREIGN PATENT DOCUMENTS

| FR | 2931960 | 12/2009 |
| KR | 1020070004356 | 1/2007 |
| KR | 1020080087321 | 10/2008 |
| SU | 1483215 | 5/1989 |

OTHER PUBLICATIONS

International Search Report for PCT/AU2010/000704, dated Sep. 15, 2010, 2 pages.

*Primary Examiner* — William Gilbert
*Assistant Examiner* — Gisele Ford
(74) *Attorney, Agent, or Firm* — Pearne & Gordon LLP

(57) ABSTRACT

A panel attachment arrangement for attaching a panel to a support having a pair of opposite sides each opposite side having an engagement lip which, in use, are on the opposite face of the support to the panel, the panel attachment arrangement including: a pair of first projections adapted to receive a pair of opposite sides of a support; each projection including an inward transverse second projection adapted to seat behind or in a corresponding one of the recesses in the support, wherein one or more of (a) the panel, (b) the first projections, or (c) the second projections are flexible or resilient, whereby the second projections can be resiliently splayed or flexed beyond the opposite sides of the support to engage the corresponding lip when the flexing force is removed.

9 Claims, 4 Drawing Sheets

(56) References Cited

U.S. PATENT DOCUMENTS

| | | | |
|---|---|---|---|
| 4,709,525 A * | 12/1987 | Adell | 52/716.6 |
| 4,732,431 A | 3/1988 | Mason | |
| 5,026,588 A * | 6/1991 | Diekmann | 428/100 |
| 5,161,343 A | 11/1992 | Edwards et al. | |
| 5,353,571 A | 10/1994 | Berdan et al. | |
| 5,390,462 A | 2/1995 | Kreiter | |
| 5,414,969 A * | 5/1995 | Krejci et al. | 52/311.3 |
| 5,603,557 A | 2/1997 | Marks et al. | |
| 6,029,846 A * | 2/2000 | Hirath et al. | 220/592.05 |
| 2005/0257436 A1 | 11/2005 | Vanderpol | |
| 2007/0188059 A1 | 8/2007 | Davis et al. | |

\* cited by examiner

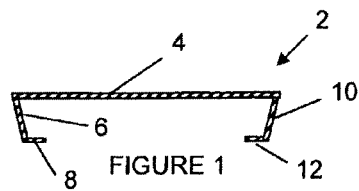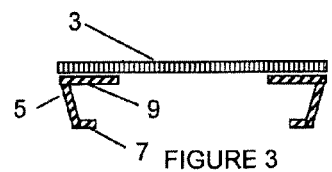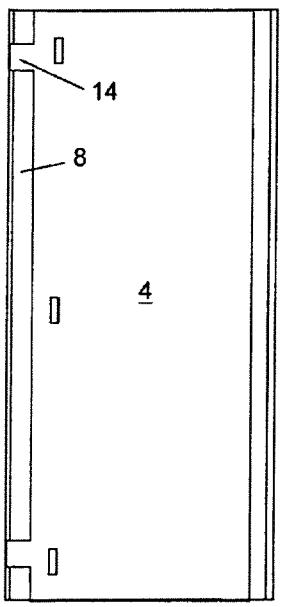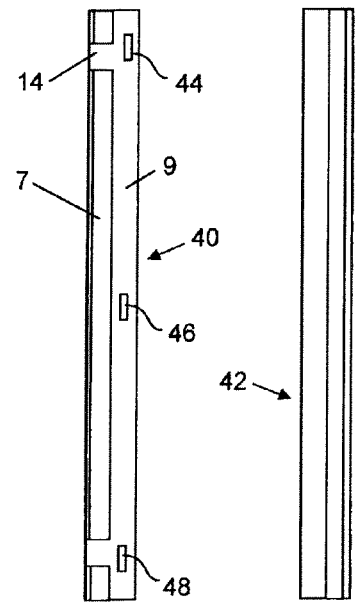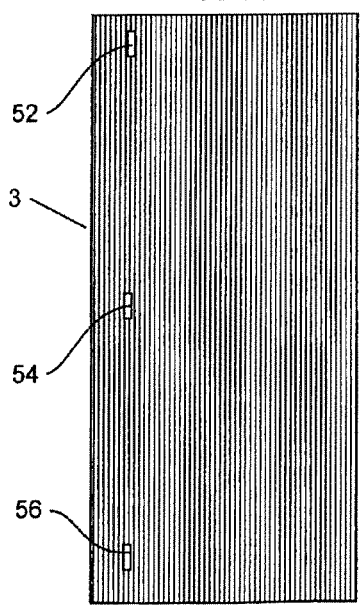

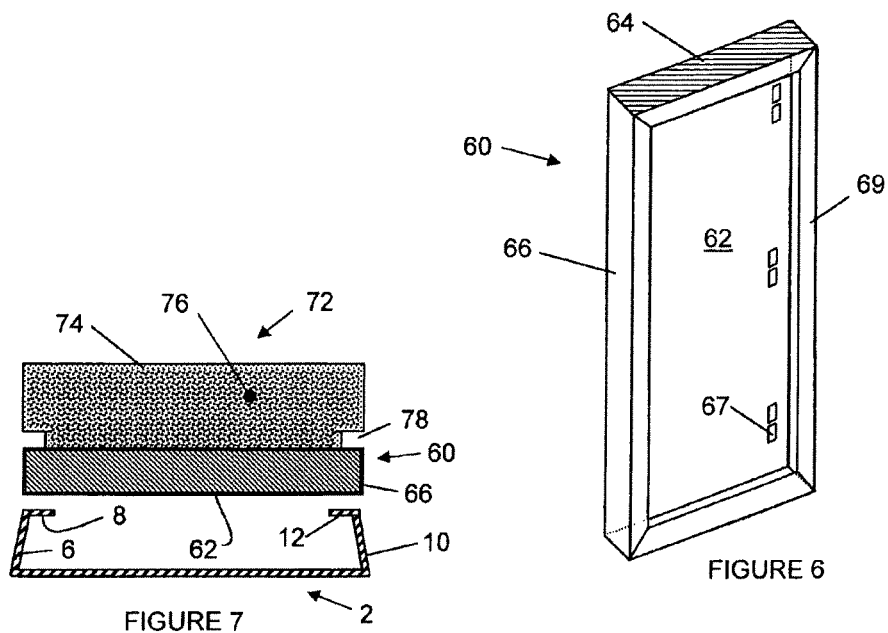
FIGURE 6
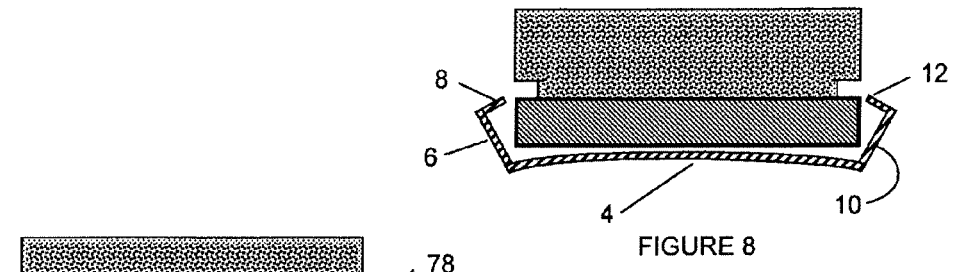
FIGURE 7
FIGURE 8
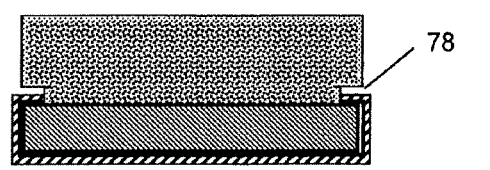
FIGURE 9
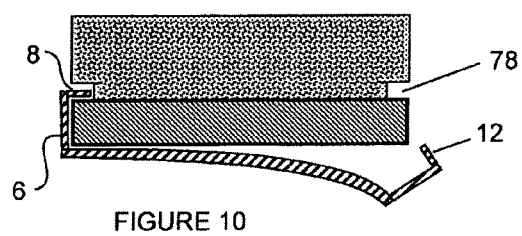
FIGURE 10

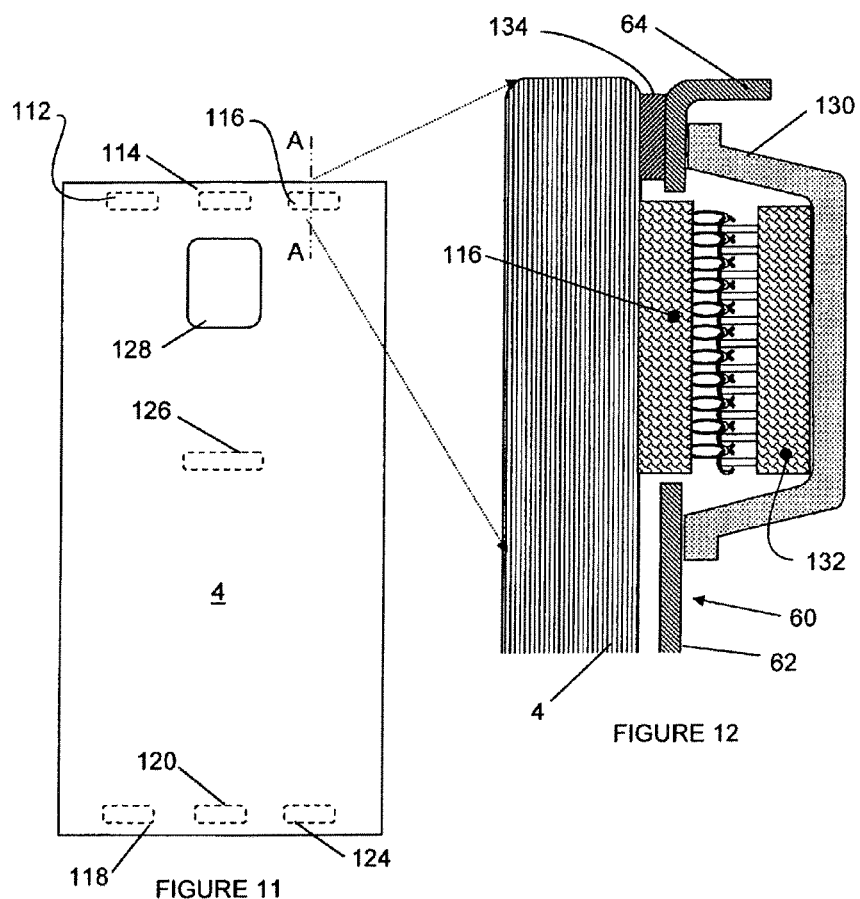
FIGURE 12
FIGURE 11
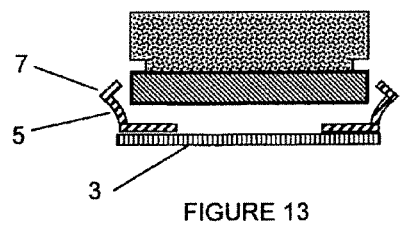
FIGURE 13
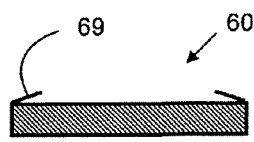
FIGURE 14

CHANGEABLE PANEL ASSEMBLY AND METHOD OF ASSEMBLING A CHANGEABLE PANEL

FIELD OF THE INVENTION

This invention relates to a panel assembly, and a method of assembling a panel.

The invention is particularly suited for panels for use on household appliances such as refrigerators, but can be used generally to attach panels.

BACKGROUND OF THE INVENTION

Consumers increasingly require flexibility in designing kitchens, and the refrigerator can be a major feature of the kitchen.

Accordingly, the present invention provides a panel arrangement which is readily assembled in the factory. Further, in some embodiments, the invention provides a panel arrangement which can be changed in situ. The panel can be decorative.

SUMMARY OF THE INVENTION

According to an embodiment of the invention, there is provided a panel attachment arrangement for attaching a panel to a support having a pair of opposite sides each opposite side having an engagement lip which, in use, are on the opposite face of the support to the panel, the panel attachment arrangement including: a pair of first projections adapted to receive a pair of opposite sides of a support; each projection including an inward transverse second projection adapted to seat behind or in a corresponding one of the recesses in the support, wherein one or more of (a) the panel, (b) the first projections, or (c) the second projections are flexible or resilient, whereby the second projections can be resiliently splayed or flexed beyond the opposite sides of the support to engage the corresponding lip when the flexing force is removed.

The panel can be formed integrally with the first and second pairs of projections.

The invention also provides a panel attachment member adapted to attach a panel to a support having a pair of opposite sides each opposite side having an engagement lip which, in use, are on the opposite face of the support to the panel, the attachment member being a longitudinal member having: a first elongate strip; a second elongate transverse strip projection from an edge of the first strip; and a third elongate strip transverse to the second strip; the first, second, and third strips forming a channel; wherein at least one of (a) the panel, (b) the second strip, or (c) the third strip is sufficiently flexible to permit the third strips to be flexed or resiliently splayed beyond the opposite sides of the support to enable the third strip to engage the corresponding lip when the flexing force is removed.

A pair of panel attachment members can be affixed to opposite sides of a panel, the third strips of each attachment member facing inward from the edge of the panel.

The panel can be made from a material selected from metal, glass, acrylic, polymeric material, laminates, or composite materials.

The attachment members can be attached to the panel by adhesive.

The arrangement can include supplementary attachment means to attach the panel to the support.

The supplementary attachment means can include double-sided adhesive tape.

The supplementary attachment means can include a hook and loop (Velcro) attachment means having a first patch attached to the panel, and a complementary second patch attached to the support.

At least one of the patches can be contained in a recess to reduce the spacing between the panel and the support.

The invention further provides a panel support including a substantially planar surface and a pair of opposed lips adapted to engage with the inward projections of the panel arrangement.

The method further provides a method of attaching a panel arrangement including the steps of resiliently splaying the inward projections of the panel attachment arrangement and engaging the inward projections with corresponding lips of the support.

BRIEF DESCRIPTION OF THE DRAWINGS

An embodiment or embodiments of the present invention will now be described, by way of example only, with reference to the accompanying drawings, in which:

FIG. 1 is an end view of a panel according to a first embodiment of the invention.

FIG. 2 shows a view of the panel of FIG. 1.

FIG. 3 is an end view of a panel arrangement according to a second embodiment of the invention.

FIG. 4 illustrates the attachment members of the arrangement of FIG. 3.

FIG. 5 illustrates a panel adapted for use with the arrangement of FIG. 3.

FIG. 6 is an illustration of a shell of a wall or door to which a panel arrangement according to embodiments of the invention can be attached.

FIG. 7 is a schematic illustration of an end view of a panel according to an embodiment of the invention juxtaposed with a door.

FIG. 8 illustrates a step I the process of applying the panel to the door of FIG. 7.

FIG. 9 illustrates the panel attached to the door.

FIG. 10 schematically illustrates an alternative means of attaching a panel to a support.

FIG. 11 is a schematic illustration of a panel with supplementary attachment means.

FIG. 12 shows a detailed sectional view of supplementary attachment means.

FIG. 13 illustrates an alternative means of attaching a panel.

FIG. 14 illustrates a modification to the door frame.

Figure 15:
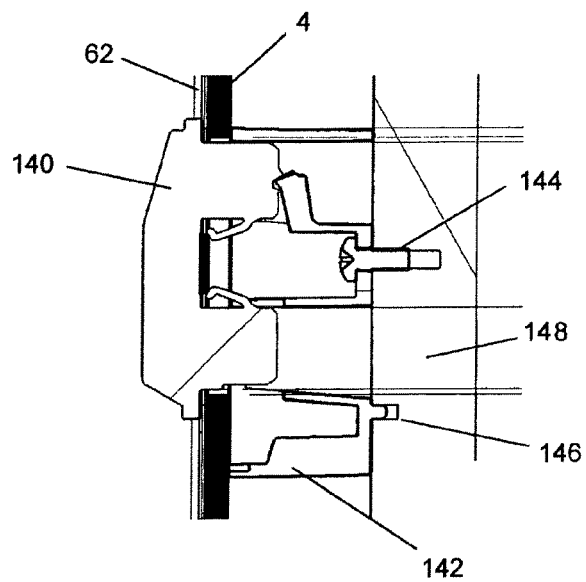
FIG. 15 is a section view of a handle attachment block assembly.

It is understood that, unless indicated otherwise, the drawings are intended to be illustrative rather than exact representations, and are not necessarily drawn to scale. The orientation of the drawings is chosen to illustrate the features of the objects shown, and does not necessarily represent the orientation of the objects in use.

DETAILED DESCRIPTION OF THE EMBODIMENT OR EMBODIMENTS

The invention will be described with reference to the embodiments in the drawings.

FIG. 1 is an end view of a panel 4 with integral attachment means 6, 8, 10, and 12 according to a first embodiment of the invention.

The panel 4 is a substantially planar rectangular panel and has attachment projection 6, 8, 10, and 12 projecting from opposite edges. The attachment projections of FIG. 1 include first projections 6, 10 which are transverse to panel 4. Preferably the projections 6, 10 are over bent to produce a stronger attachment force. For example, the projections can be inwardly inclined to the perpendicular to the panel. Preferably the projections are inclined at between about 2° to 4°. The ends of projections 6, 10 are folded inwards to form a second set of projections 8, 12 transverse to the first set of projections 6, 10. Preferably the second projections can also be inclined to the perpendicular to the first projections, and are approximately parallel with the plane 4.

The same material can be used for the panel and the attachment projections, so it can be formed, for example, in a pressing or forming operation. For example, the panel can be of metal or plastics.

As will be discussed with reference to FIGS. 7 to 9, preferably, at least one of the panel 4, the first projections 6, 10, or the second projections 8, 12 are sufficiently flexible to permit the second projections to be flexibly splayed or flexed outwardly to permit the second projections to engage behind or in a groove in a support. The representations are not to scale. In one embodiment, the first projections can be of the order of 72 mm and the second projections can be of the order of 37 mm. However, the second projections can be of the order of 20 mm or less in width, while in another embodiment they can be in the range of around 3 to 4 mm wide up to 10 to 12 mm wide.

The top and bottom edges of the panel and the first projections can be folded inwards. The inward folds can mate with a groove in a cover to close the assembly for foaming.

FIG. 2 is an underside view of the panel of FIG. 1. The panel 4 is rectangular in shape, and the opposite long sides each have the attachment projections formed therealong. The over-bending of the projections provides sufficient attachment force to hold the panel in place when it is attached, for example, as shown in FIGS. 7 to 10.

Alternatively, or additionally, a number of fixing holes or screw holes can be formed in the inward projections 8.

As can be seen in FIG. 2, the inward projection 8 has cut-out portions such as 14. The opposite projection 12 can be a mirror image of projection 8. In an alternative arrangement, the cut-out portions can be on one side only. The top and bottom edges of the panel 4 can be folded inwards.

The panel support in the embodiment of FIGS. 7 to 9 is a door for a refrigerator having a metal frame 60 as shown in FIG. 6. The frame has a box construction having a closed end 62, side walls such as 66, the ends of which are folded inwards as shown, for example, at 69 around the periphery of an open end opposed to the close end 62. Thus the frame forms a cavity which can be filled with, for example, foamed insulating material. The top of the frame 64 has been shaded to assist in eliminating visual ambiguity, and to assist in identifying the orientation of the frame in following figures.

Optionally, attachment holes, such as screw holes, can be formed in the closed surface 62 to align with corresponding attachment holes in the panel arrangement. Apertures 67 can also be formed in the surface 62 for attachment of the handle attachment bases.

FIG. 7 shows a schematic top view of a panel arrangement 2 according to the embodiment of the invention illustrated in FIGS. 1 & 2, and a panel support 72, which, in this case is an insulated door of a refrigerator having a frame such as 60 illustrated in FIG. 6. The front panel of the door 62 and side wall 66 are indicated to provide reference points with the frame of FIG. 6.

The door 72 has been filled with an insulating material which, in this example, is shiny skin insulation, such as foamed insulation in which the rapid cooling of the outer skin 74 of the insulation causes it to form a more coherent structure than the inner insulating material 76. Suitable insulating materials, preferably those which form a skin, such as polyurethane foam or polyurethane combined with Vacuum insulation panel, and are suitable for use with storage of food items, can be used. A pair of longitudinal recesses, such as 78 are formed in the insulation, one on each side of the door, so that the peripheral frame 69 is exposed for use in attaching the panel 2 via the attachment projections 8, 12. The foamed insulation also fills the cavity of the door frame 60.

The projections 6, 10 are spaced apart sufficiently to contain the panel in a close or slightly resilient fit. However, as can be seen in FIG. 7, the distance between the ends of inward panel attachment projections 8, 12 is smaller than the width of the frame 60. However, the panel arrangement 2 is made of a unitary material which is flexible. Thus, as illustrated in FIG. 8, the panel can be flexed to splay the inward attachment projections 6, 10 outward, so the ends of the inward projections 8, 12 are spaced apart by a distance greater than the width of the door frame 60. The panel can thus be located so the frame is within the panel. This permits the inward projections to be released so that they relax back into the recesses 78 as shown in FIG. 9.

Alternatively, as shown in FIG. 10, one end of the panel arrangement can be applied to the door so the inward projection 8 is located in its corresponding recess, and the panel can be flexed so the other inward projection 12 can be located in its corresponding recess 78.

FIGS. 3, 4, 5, & 13 illustrate an alternative panel arrangement according to an embodiment of the invention. FIG. 3 is an end view of the panel arrangement, FIG. 4 is an underside view of the attachment channels 40, 42, and FIG. 5 is a view of the panel 3. In this embodiment, the panel arrangement includes separate panel 3 and side attachment channels 40 & 42. The side channels include an attachment strip 9, a first transverse projection, 5, and a second, inward projection 7 presenting a substantially "J" shaped section. The panel can be of any suitable material, for example acrylic or metal. The channels can be attached to the panel by any suitable means.

In one embodiment, the channels are attached to the panel by adhesive. The adhesive should be durable, expected life time 20 years, due to the average lifespan of refrigerator. It should have a temperature resistance from −15° C. to 65° C., which may happen during transportation.

The side attachment members and panel can be loaded into a jig and clamped together for at least a minimum time to allow the adhesive to bond to the materials. When using 3M VHB 5652, the components should be clamped for a minimum of one minute with a clamp pressure of 100 KPa.

The adhesive should be have good water & chemical agent resistance, which may be experienced during cleaning. The adhesive should have fast cure, and achieve bonding strength within 15 minutes to increase productivity. Preferably the adhesive should be odorless or low odour. Irritating odour is harmful to operator therefore require investment on ventilation system.

The adhesive can be double sided adhesive tape, for example, 3M VHB 5652 or 3M VHB 5952, but alternatives such as Loctite 5590, Loctite 5610 can be used.

Different types of adhesive can be used in different locations. For example, with an acrylic panel, the vertical edges can have a strip of 3M VHB5652 or 3Mm VHB5952 of about 11 mm width applied along the sides. Similar adhesive can be used for the door handle apertures. The top and bottom of the panel can have 3M VHB4920 applied in as trip of about 11 mm width.

3M VHB5652 or 3Mm VHB5952 can be used for permanent joints. VHB4920 permits the join to be re-opened if required.

The panel can be made of different material from the attachment channels.

In one implementation, the panel can be flexible, so the panel arrangement can be applied in a similar manner to the arrangement of FIGS. 1 & 2.

However, in an alternative embodiment, for example where the panel is of glass and the channels are of stainless steel, the panel may be insufficiently flexible to permit the attachment projections to be resiliently splayed to a sufficient amount to pass outside the edges of the door frame. FIG. 13 illustrates an embodiment in which the panel 3 is insufficiently flexible to enable the inward ends of the projection 7 to clear the sides of the door frame. In this case, the projection 5, can provide the required flexibility. In this case, the attachment projections such as 5 can be sufficiently flexible to permit the inward projections to pass around the frame and be located in the corresponding recesses such as 78.

The method of attaching the panel arrangement illustrated in FIG. 10 is also suitable for use with this embodiment.

Also shown in FIG. 4 are door handle attachment slots 44, 46, 48. These slots can be used in conjunction with a handle attachment arrangement such as that described in copending Australian patent application AU2008216999 by AB Electrolux, the contents of which are hereby incorporated by reference. Further, as shown in FIG. 5, the panel 3 can include apertures 52, 54, 56 which correspond to the door handle attachment slots 44, 46, 48.

FIGS. 11 & 12 illustrate an optional supplementary attachment arrangement, in this example using 3M Dual Lock SJ-4570, or Velcro™. While the long sides of the panel 4 are attached via the attachment channels, the top and bottom edges of the panel are not attached to the door frame by the main attachment means. Thus, the arrangement of FIGS. 11 & 12 provides supplemental attachment means 112, 114, 116, 118, 120, 124, and central supplemental attachment 126. FIG. 12 is an expanded section view along the line AA in FIG. 11. The fascia panel 4 has s first attachment element, in this case Velcro patch 116 attached to the panel. A corresponding complementary attachment element, Velcro patch 132 is attached to the frame 60. In this case, to ensure that the fascia is close to the surface 62 one or both Velcro patches can be installed in recesses. In this example, the Velcro patch 132 is contained in recessed pocket 130 which is attached to the frame 60. A gap filler 134 can be applied along the edges between the fascia 4 and the frame 60. The gap filler can be 0.5 mm rubber strip or tape.

A display, touch panel, or control panel aperture 128 can be provided in both the fascia to align with a corresponding aperture in the door frame.

FIG. 14 illustrates a modification of the door frame 60. The inwardly turned edges 69 can be inclined out of the plane of the back surface of the frame so that, when the panel arrangement is attached, the inward projections such as 8, 12 are maintained in contact with the angled edges 69 with a resilient force.

FIG. 15 is a section view of a handle attachment block assembly. The mounting block bases, such as 140, are mounted through corresponding first slots in the door frame surface 62. The mounting block base is attached to the door frame before the door is filled with foam insulation. The panel 4 has corresponding slots (see FIG. 5) through which the mounting block passes when the panel is attached to the frame. The handle 148 is attached to a mounting pedestal 142 by a screw attachment 144, and register pin and socket 146. The pedestal is a snap-fit on the projecting base 140.

The projections 8 and 12 can be continuous or intermittently located in discrete locations along the length of the first projections 6 and 10.

Figure 16:
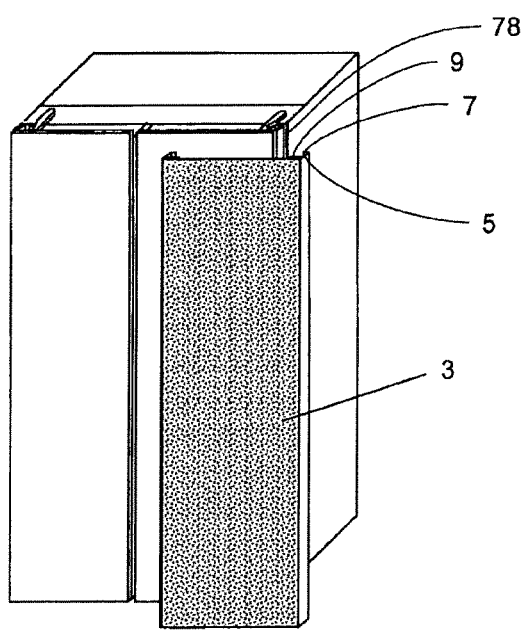
FIG. 16 shows a panel preparatory to attaching to a refrigerator door.

As shown in FIG. 16, the panel 3 can be attached to the door assembly on the refrigerator. The attachment projections such as 5, 7 can engage the corresponding grooves 78 on either side of the door assembly as described above.

When the panel arrangement is assembled in the factory, the base attachments for the handles and the display and associated wiring can be placed in location before the assembly is filled with foamed insulation. The base attachments for the handle are inserted through the cut-outs in the frame before the foamed insulation is applied. Similarly, where a display or control panel is to be attached to the door, the electronic equipment and wiring can be attached before the foam insulation is applied. The panel arrangement can be attached to the door frame and the attachment channels can be attached to the frame, by, for example, the clamping force of the over-bent projections, or screws, after the assembly is filled with foamed insulation.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up", "down", "vertical", "horizontal", "left", "right" "upright", "transverse" etc. are not intended to be absolute terms unless the context requires or indicates otherwise. These terms will normally refer to orientations shown in the drawings.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A panel attachment arrangement for attaching a panel to a support, wherein the support comprises a pair of opposite sides, wherein each opposite side comprises an engagement lip, and wherein the panel attachment arrangement further includes a pair of first projections, wherein the first projections are configured to provide a clamping force to receive the pair of opposite sides of the support; and wherein each first projection further comprises an inward transverse second projection to seat behind or in a corresponding one of the engagement lips, and wherein one or more of (a) the panel, (b) the first projections, or (c) the second projections are flexible or resilient, whereby the second projections can be resiliently splayed or flexed beyond the opposite sides of the support to engage the corresponding lip when the flexing force is removed, and wherein the first and second projections comprise cut out portions.

2. A panel attachment arrangement as in claim 1, wherein the panel is formed integrally with the first and second pairs of projections.

3. A panel attachment arrangement as in claim 1, wherein the panel is formed separately from the first and second projections.

4. A panel attachment arrangement as in claim 3, wherein the panel is attached to the first and second projections by an attachment strip.

5. A panel attachment arrangement as in claim 1, wherein the support is a refrigerator door.

6. A panel attachment arrangement for attaching a panel to a support, wherein the support comprises a pair of opposite sides, wherein each opposite side comprises an engagement lip, and wherein the panel attachment arrangement further includes a pair of first projections, wherein the first projections are configured to provide a clamping force to receive the pair of opposite sides of the support; and wherein each first projection further comprises an inward transverse second projection to seat behind or in a corresponding one of the engagement lips, and wherein one or more of (a) the panel, (b) the first projections, or (c) the second projections are flexible or resilient, whereby the second projections can be resiliently splayed or flexed beyond the opposite sides of the support to engage the corresponding lip when the flexing force is removed, wherein the panel is formed separately from the first and second projections, and wherein the panel is attached to the first and second projections by an attachment strip.

7. A panel attachment arrangement as in claim 6, wherein the panel is formed integrally with the first and second pairs of projections.

8. A panel attachment arrangement as in claim 6, wherein the first and second projections comprise cut out portions.

9. A panel attachment arrangement as in claim 6, wherein the support is a refrigerator door.

* * * * *